United States Patent
Nakagawa et al.

(10) Patent No.: US 8,033,390 B2
(45) Date of Patent: Oct. 11, 2011

(54) WEAR RESISTANT, HEAT RESISTANT CONVEYOR CHAIN

(75) Inventors: Takashi Nakagawa, Osaka (JP); Hiroki Ishida, Osaka (JP); Makoto Fujiwara, Osaka (JP); Ryutaro Nakamura, Osaka (JP); Nobuo Kitao, Osaka (JP); Tatsuo Nagata, Osaka (JP); Satoshi Nakatou, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 254 days.

(21) Appl. No.: 12/540,461

(22) Filed: Aug. 13, 2009

(65) Prior Publication Data

US 2009/0294258 A1    Dec. 3, 2009

Related U.S. Application Data

(63) Continuation-in-part of application No. 11/764,847, filed on Jun. 19, 2007, now abandoned.

(30) Foreign Application Priority Data

Jul. 3, 2006 (JP) ................................. 2006-183613

(51) Int. Cl.
*B65G 17/06* (2006.01)
(52) U.S. Cl. ...................................................... 198/851
(58) Field of Classification Search .................. 198/850, 198/851, 852, 853
See application file for complete search history.

(56) References Cited

U.S. PATENT DOCUMENTS

| | | | |
|---|---|---|---|
| 3,437,190 A | 4/1969 | Gilewski | |
| 3,840,112 A | 10/1974 | Hartwig | |
| 4,968,546 A | 11/1990 | Takahashi | |
| 6,293,390 B1 | 9/2001 | Kilby | |
| 6,629,596 B2 | 10/2003 | Teuber | |
| 6,855,080 B2 * | 2/2005 | Kanehira et al. | 474/231 |
| 6,978,886 B2 | 12/2005 | Karnes | |
| 2003/0032511 A1 | 2/2003 | Kanehira | |

FOREIGN PATENT DOCUMENTS

| | | |
|---|---|---|
| JP | 59-146309 | 9/1984 |
| JP | 06-227632 | 8/1994 |
| JP | 2003-056650 | 2/2003 |

* cited by examiner

*Primary Examiner* — Joseph A Dillon, Jr.
(74) *Attorney, Agent, or Firm* — Henry H. Skillman; Dann, Dorfman, Herrell & Skillman

(57) ABSTRACT

A wear resistant, heat resistant conveyor chain comprising a series of links, each having a heat resistant roller rotatably fitted onto a bush between inner plates. The links are interconnected in the longitudinal direction of the chain by outer plates, and connecting pins rotatably inserted into the bush. A wear resistant, heat resistant sleeve-shaped spacer protrudes beyond the end surfaces of the heat resistant rollers toward the right and left inner plates to eliminate any sliding contact between the end surface of the heat resistant roller and the inner side surface of the inner plate.

5 Claims, 4 Drawing Sheets

WEAR RESISTANT, HEAT RESISTANT CONVEYOR CHAIN

CROSS REFERENCE TO RELATED APPLICATIONS

This application is a continuation-in-part of application Ser. No. 11/764,847, filed Jun. 19, 2007 now abandoned, which in turn claims priority to JP Application 2006-183613, filed Jul. 3, 2006, each of the foregoing applications being incorporated herein by reference.

FIELD OF INVENTION

The present invention relates to a wear resistant, heat resistant conveyor chain used in a conveying device, and more specifically it relates to a wear resistant, heat resistant conveyor chain used under environment of heat resistant operation of a bread baking oven or the like.

BACKGROUND OF THE INVENTION

As a conveyor chain used under severe use environment required for heat resistance and the like, a conveyor chain in which a number of link plates are continuously connected to each other through link pins and a roller is attached to said link pin through a bush, characterized in that said bush is composed of stainless steel and said roller is composed of at least a PEEK resin (polyetheretherketone resin) in at least an inner diameter portion, has been known (see, for example, Japanese Laid-Open Patent Publication No. Hei. 6-227632 (see column 1, FIG. 3)).

However, in the above-mentioned conveyor chain, a metallic wear powder produced due to sliding contact between an end surface of a roller and an inner side surface of an inner link plate enters between an inner circumferential surface of the roller and an outer circumferential surface of the bush, and such metallic wear powder functions as a polishing agent and generates abnormal one side wear between the roller and the bush. As a result there were troublesome problems in handling of the chain in that a chain wear elongation is not only increased (to markedly decrease the life of the chain) but also the sliding contact sound during a chain operation is markedly increased.

Accordingly, the present invention is made to solve the above-mentioned related art problems; that is, the object of the present invention is to provide a wear resistant, heat resistant conveyor chain, in which chain wear elongation due to one side wear between an inner circumferential surface of a roller and an outer circumferential surface of a bush is significantly suppressed even under environment of a heat resistant operation, so that the life of the chain can be maintained, and in which sliding contact noise between the inner circumferential surface of the bush and the outer circumferential surface of the bush is reduced so that quiet chain operation environment can be ensured.

SUMMARY OF THE INVENTION

First, the invention solves the above-mentioned problems by using a wear resistant, heat resistant conveyor chain comprising a pair of right and left spaced inner plates, a bush press-fitted into bush holes in said inner plates, a heat resistant roller rotatably fitted onto the bush, a connecting pin rotatably inserted into said bush and a pair of right and left spaced outer plates, which connects said inner plates in a longitudinal direction of the chain by press-fitting both ends of said connecting pin into pin holes, characterized in that a wear resistant, heat resistant sleeve-shaped spacer is provided between said heat resistant roller and said bush. The spacer eliminates the sliding contact between end surfaces of said heat resistant roller and inner side surfaces of the inner plate by being protruded beyond the roller end surfaces of said heat resistant roller toward the pair of right and left inner plates.

Further, the wear resistant, heat resistant conveyor chain embodying a second feature of the invention solves the above-mentioned problems by that, in addition to the above-described configuration of the invention, the sleeve-shaped spacer is integral with an inner circumferential surface side of the heat resistant roller.

A further wear resistant, heat resistant conveyor chain embodying the invention solves the above-mentioned problems by that, in addition to the above-described configuration of the invention, the chain provides a sleeve-shaped spacer with a pair of right and left flanged ring members, each member having a flange loosely fitted between said heat resistant roller and said bush and protruding beyond the roller toward the inner plate.

Since the present invention has the following configurations in a wear resistant, heat resistant conveyor chain comprising a pair of right and left spaced inner plates, a bush press-fitted into bush holes in said inner plates, a heat resistant roller rotatably fitted onto the bush, a connecting pin rotatably inserted into said bush and a pair of right and left spaced outer plates, which connects said inner plates in a longitudinal direction of the chain by press-fitting both ends of said connecting pin into pin holes, the present invention has particularly advantageous effects.

Because the sleeve-shaped spacer protrudes beyond the end surfaces of the heat resistant roller toward the pair of right and left inner plates, the sliding contact between the roller end surfaces of the heat resistant roller and the inner side surfaces of the inner plate can be fully avoided. Thus, any metallic powder liable to be produced between the end surface of the heat resistant roller and an inner side surface of the inner plate is blocked, even under environment of a heat resistant operation, so that smooth sliding contact between an inner circumferential surface of the heat resistant roller and an outer circumferential surface of the bush can be maintained without generating one side wear therebetween, and, at the same time, chain wear elongation is significantly suppressed so that the life of the chain can be maintained for a long period of time. Further, the sliding contact noise between the inner circumferential surface of the heat resistant roller and the outer circumferential surface of the bush is reduced so that quiet environment of a chain operation can be ensured.

Further, when the sleeve-shaped spacer is integrally adhered to an inner circumferential surface side of a heat resistant roller, in addition to blocking the formation of any metallic powder, the invention avoids skewing, rocking or one-side positioning of the heat resistant roller in a chain width direction on an outer circumferential surface of the sleeve-shaped spacer during an operation of the chain. Thus, the snaking of the chain in the chain width direction is suppressed so that stable chain traveling can be realized.

Further, when the sleeve-shaped spacer comprises a pair of right and left flanged ring members, the flanges of the flanged ring members eliminate any sliding contact between an end surface of the heat resistant roller and an inner side surface of the inner plate and reliably positions the heat resistant roller on a flanged ring member so that skewing, rocking or one-side positioning of the heat resistant roller in the chain width direction can be blocked, and contact surface pressure of the sleeve-shaped spacer with respect to an inner side surface of the inner plate is reduced whereby abrasion loss of the flanged ring member itself is suppressed and a long insulation function between the end surface of the heat resistant roller and the inner side surface of the inner plate can be achieved.

Further, when a pair of right and left flanged ring members are each loosely fitted between the heat resistant roller and the bush, the assembling operation of the chain and the assembling/disassembling operation during any coupling/decoupling operation of the chain are easily performed and any difference in coefficients of thermal expansion between the heat resistant roller and the bush is accommodated so that smooth sliding contact can be maintained. Further, since the pair of right and left flanged ring members are rotated about the bush at a rotating speed slower than the heat resistant roller due to slip generated between the flanged ring member and the heat resistant roller, the sliding wear with respect to the inner side surface of the inner plate is even more reduced so that excellent endurance can be exhibited.

Any chain wear elongation due to one-side wear between an inner circumferential surface of a roller and an outer circumferential surface of a bush is significantly suppressed even under environment of a heat resistant operation so that the life of the chain is maintained for a long period of time, and sliding contact noise between the inner circumferential surface of the roller and the outer circumferential surface of the bush is reduced so that quiet chain operation is ensured.

The material of the sleeve-shaped spacer has wear resistance and heat resistance, and any one of materials comprising graphite, polybenzimidazole, polyamideimide, polyetherimide or the like may be used. Particularly, in a case where graphite is used, even if it is subjected to a maintenance operation such as periodic saltwater washing treatment under a severe use environment in a bread baking oven or the like, excellent corrosion resistance and salt resistance are exhibited.

In the chain, the sleeve-shaped spacer may be integrally adhered to the inner circumferential side of the heat resistant roller, so that it protrudes beyond the end surfaces of the heat resistant roller toward the inner plates and any sliding contact between the roller end surface and the inner side surface of the inner plate is avoided. The sleeve-shaped spacer may be comprised of a pair of flanged ring members, which have flanges protruding toward inner plates which are loosely fitted between the heat resistant roller and the bush. The sleeve-shaped spacer may be integrally adhered to the roller by any one of processing means such as press-fitting, heat welding, adhesion bonding and the like. Particularly where press-fitting is used and the sleeve-shaped spacer is used in a bread baking oven, which is severe use environment due to dust and high heat from burnt bead materials, reliable and excellent adhesion strength can be achieved.

When an annular groove or the like for judging a degree of sliding contact wear is provided on an inner circumferential surface portion protruding from a roller end portion of the heat resistant roller, the need for replacement of a worn sleeve-shaped spacer can be visually judged without use of a measuring instrument or the like. Thus this configuration is more preferred in maintenance of the chain.

Further, if the specified material of the heat resistance roller incorporated in the wear resistant, heat resistant conveyor chain of the present invention must have heat resistance, any one of groups of stainless steel, iron, aluminum and the like may be selected. Particularly, when stainless steel is adopted in a bread baking oven having many causes of rust formation due to periodic saltwater washing treatment, excellent corrosion resistance and rust prevention are preferably exhibited.

BRIEF DESCRIPTION OF THE DRAWINGS

Wear resistant, heat resistant conveyor chains according to the present invention will be described below with reference to drawings.

DESCRIPTION OF THE PREFERRED EMBODIMENTS

Figure 1:
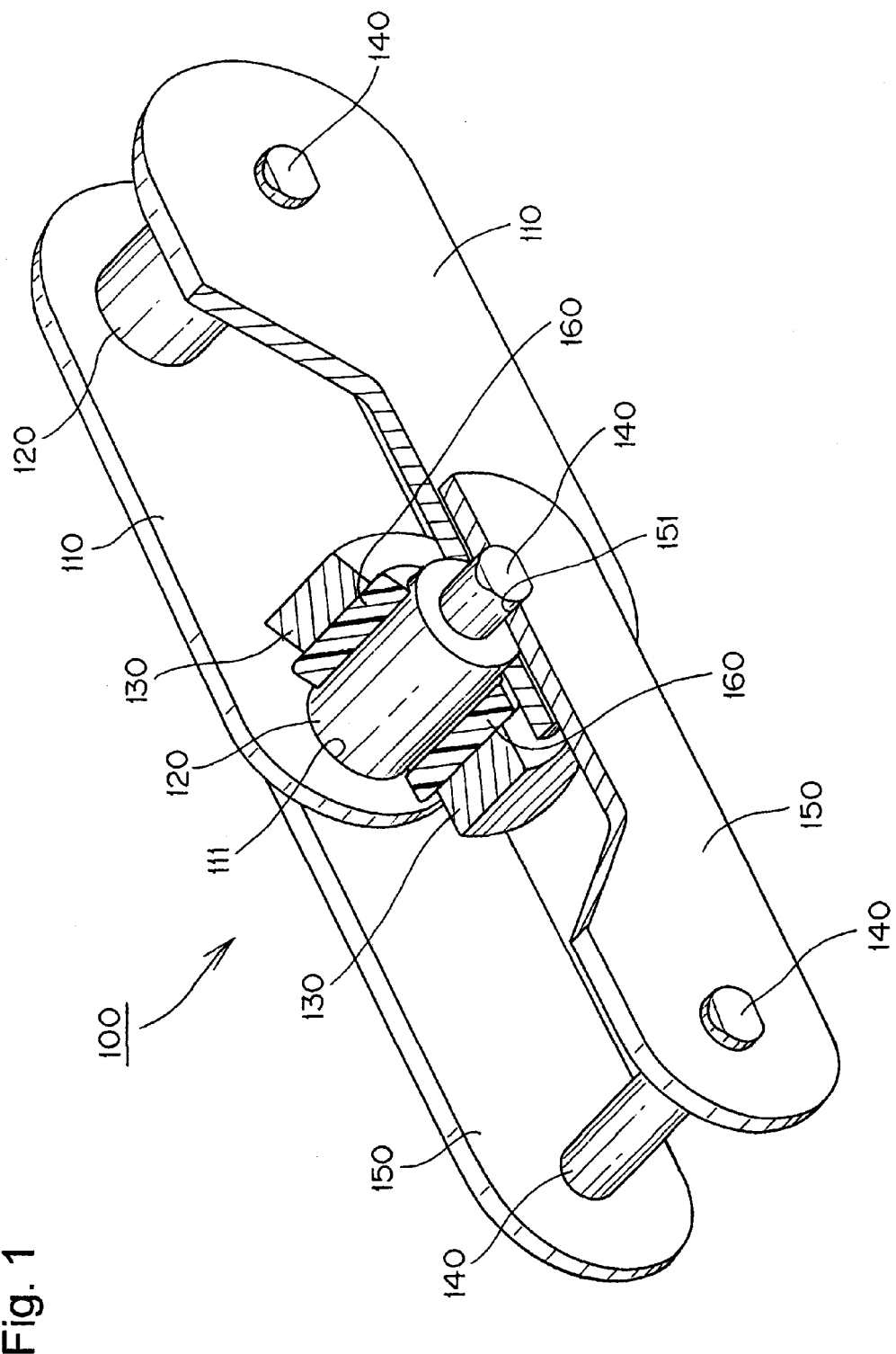
FIG. 1 is a perspective view of adjoining links of a wear resistant, heat resistant conveyor chain, which is the first example of the present invention, portions being broken away to more clearly illustrate the construction thereof.
Figure 2:
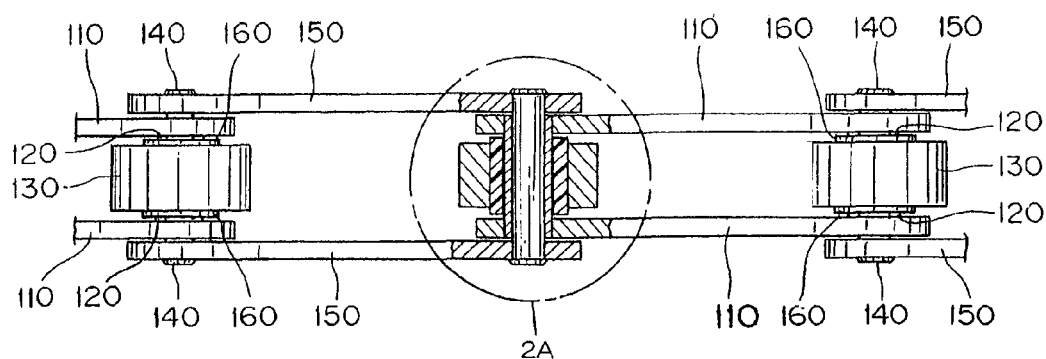
FIG. 2 is a plan view, partially in cross-section, of the wear resistant, heat resistant conveyor chain, shown in FIG. 1.
Figure 2A:
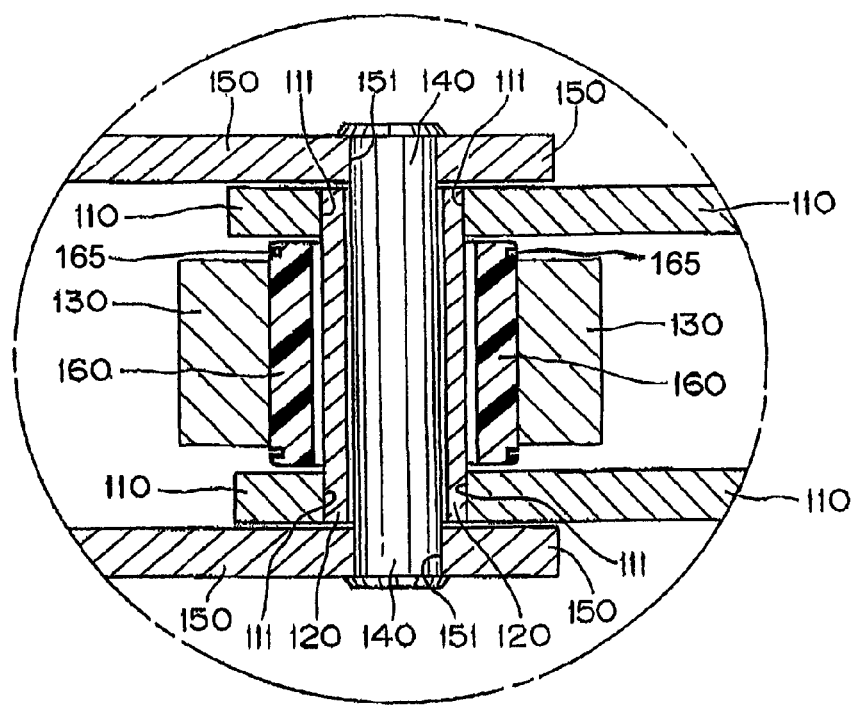
FIG. 2A is an enlarged view of the cross-sectioned parts of the chain in FIG. 2.

As shown in FIGS. 1 and 2, the first example of the present invention comprises a chain 100 having a series of links, each with a pair of right and left spaced inner plates 110, bushes 120 press-fitted into bush holes 111 in the inner plates 110, a heat resistant roller 130 rotatably fitted onto the bush 120. The links are interconnected by connecting pins 140 rotatably inserted into the bush 120 and a pair of right and left spaced outer plates 150 which interconnect the inner plates 110 of adjoining links in a longitudinal direction of the chain by press-fitting both ends of the connecting pins 140 into pin holes 151. The chain is preferably used while incorporated into a bread baking oven (not shown).

Preferably, the chain parts comprising the above-mentioned inner plates 110, the bush 120, the heat resistant roller 130, the connecting pin 140, and the outer plates 150 are all made of stainless steel having heat resistance. Therefore, even if the temperature in a bread baking oven is increased to approximately 200° during its use, abnormalities such as dimensional deformation and the like are not generated. Further, even if the bread baking oven presents many causes of rust formation due to periodic saltwater washing treatment, excellent corrosion resistance and rust prevention are achieved.

A sleeve-shaped spacer 160, which is most characteristic in the wear resistant, heat resistant conveyor chain 100 of the first example is positioned between each bush 120 and the associated roller 130, as will be described below in more detail.

First, as shown in FIGS. 1 and 2, the sleeve-shaped spacer 160 is formed of wear resistant, heat resistant graphite and is press-fitted on an inner circumferential surface side of the heat resistant roller 130 so as to be integrally adhered thereto. And the sleeve-shaped spacer 160 is concentrically provided between the heat resistant roller 130 and the bush 120.

Both end portions of the sleeve-shaped spacer 160 protrude beyond the end surfaces of the heat resistant roller 130 toward the pair of right and left inner plates 110 so that the sliding contact between an end surface of the heat resistant roller 130 and the inner side surface of the inner plate 110 can be fully avoided.

It is noted that a circumferential portion of the sleeve-shaped spacer 160 protruding from the end portion of the heat resistant roller 130 has an annular groove 165 for visually judging a degree of wear of the sleeve-shaped spacer 160.

Since in the thus obtained wear resistant, heat resistant conveyor chain 100 of the first example, the wear resistant, heat resistant sleeve-shaped spacer 160 is concentrically provided between the heat resistant roller 130 and the bush 120, the sleeve-shaped spacer 160 protrudes beyond the end surfaces of a heat resistant roller 130 toward the pair of right and left inner plates 110, 110 so that the sliding contact between the end surfaces of the heat resistant roller 130 and the inner side surfaces of the inner plate 110 can be fully avoided. Thus, the formation of any metallic powder liable to be produced between an end surface of the heat resistant roller 130 and an inner side surface of the inner plate 110 is blocked even under environment of a heat resistant operation so that smooth sliding contact between an inner circumferential surface of the heat resistant roller 130 and an outer circumferential surface of the bush 120 can be maintained without generating one side wear therebetween, and at the same time a chain wear elongation is significantly suppressed so that the life of the chain can be maintained for a long period of time. Further, the sliding contact noise between the inner circumferential surface of the heat resistant roller 130 and the outer circumferential surface of the bush 120 is reduced so that quiet environment of a chain operation can be ensured.

Since the sleeve-shaped spacer 160 is integrally adhered to an inner circumferential surface side of the heat resistant roller 130, skewing, rocking or one-side positioning of the heat resistant roller 130 in a chain width direction on an outer circumferential surface of the sleeve-shaped spacer 160 can be fully blocked during an operation of the chain. Thus the snaking of the chain in the chain width direction is suppressed so that stable chain traveling can be realized. Thus, the advantages of the first example of the present invention are very large.

Next, a wear resistant, heat resistant conveyor chain 200 of the second example according to the present invention will be described below with reference to FIGS. 3 and 4.

The wear resistant, heat resistant conveyor chain 200, which is the second example of the present invention, comprises a pair of right and left spaced inner plates 210, bushes 220 press-fitted into bush holes 211 in the inner plates 210, a heat resistant roller 230 rotatably fitted onto each bush 220, connecting pins 240 rotatably inserted into the bushes 220 and a pair of right and left spaced outer plates 250 which interconnect the inner plates 210 which link to the adjoining links in a longitudinal direction of the chain by press-fitting both ends of the connecting pin 240 into pin holes 251. The chain is preferably used while incorporated into a bread baking oven (not shown).

Since a chain part comprising the above-mentioned inner plates 210, the bush 220, the heat resistant roller 230, the connecting pin 240, and the outer plates 250 are all made of stainless steel having heat resistance, even if a temperature in a bread baking oven is increased to approximately 200 during its use, abnormalities such as dimensional deformation and the like are not generated. Further, even if the chain part is used in a bread baking oven having many causes of rust formation due to periodic saltwater washing treatment, excellent corrosion resistance and rust prevention are exhibited.

A sleeve-shaped spacer 260, which is most characteristic in the wear resistant, heat resistant conveyor chain 200 of the second example, will be described below in more detail.

Figure 3:
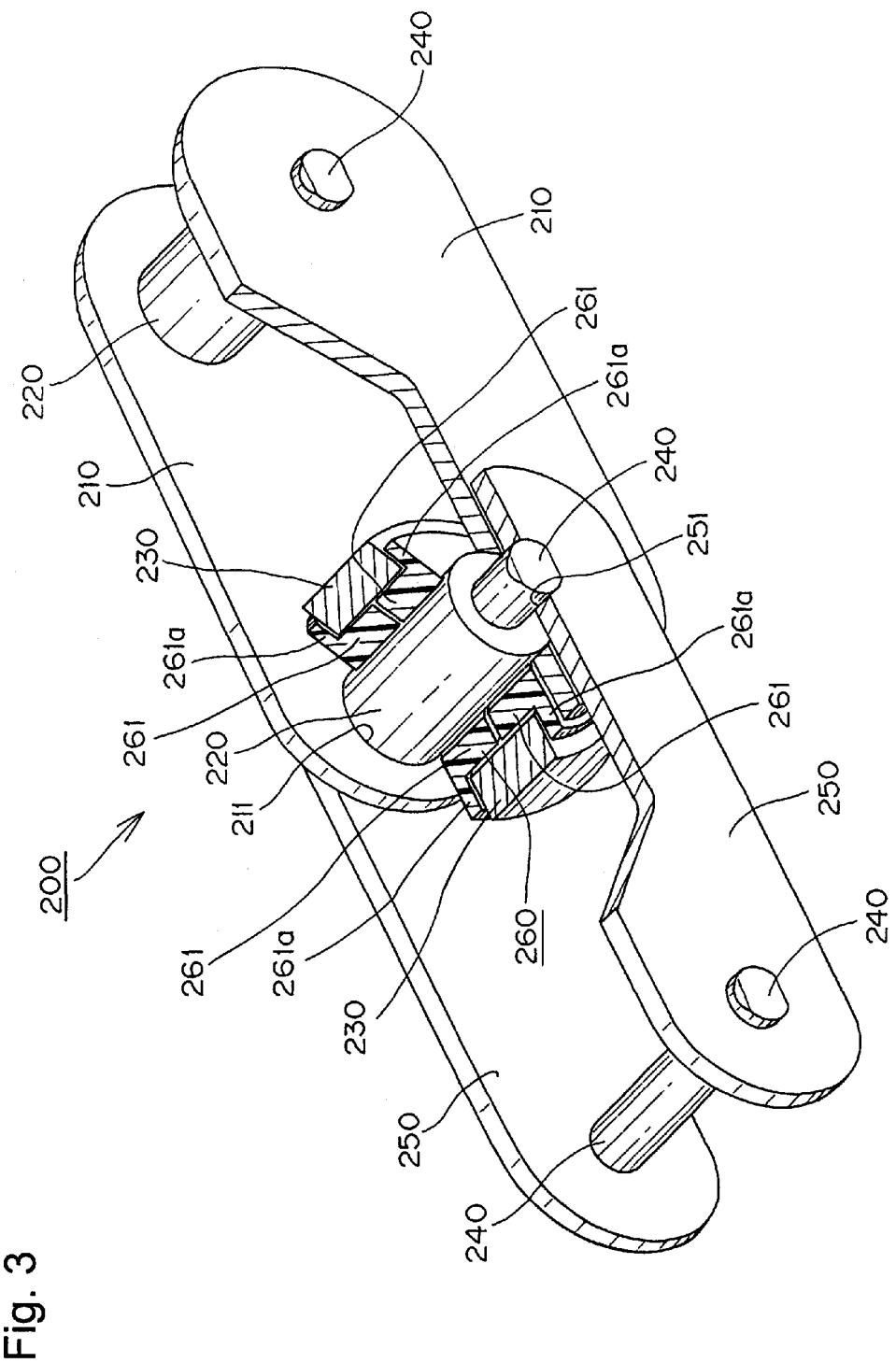
FIG. 3 a perspective view of adjoining links of a wear resistant, heat resistant conveyor chain, which is the second example of the present invention, portions being broken away to more clearly illustrate the construction thereof.
Figure 4:
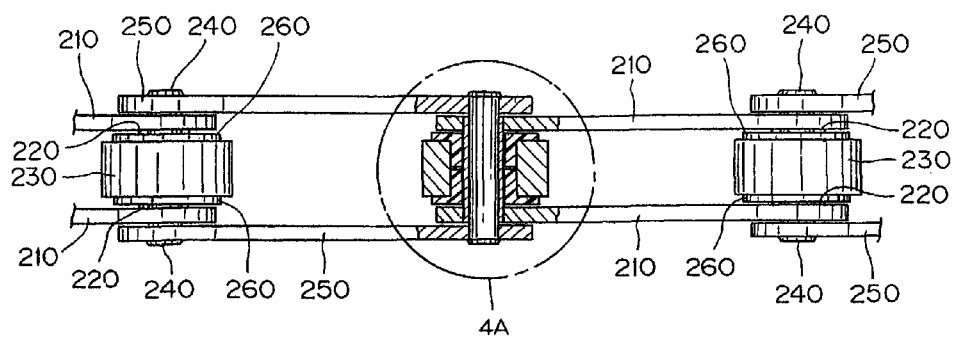
FIG. 4 is a plan view, partially in cross-section, of the wear resistant, heat resistant conveyor chain, shown in FIG. 3.
Figure 4A:
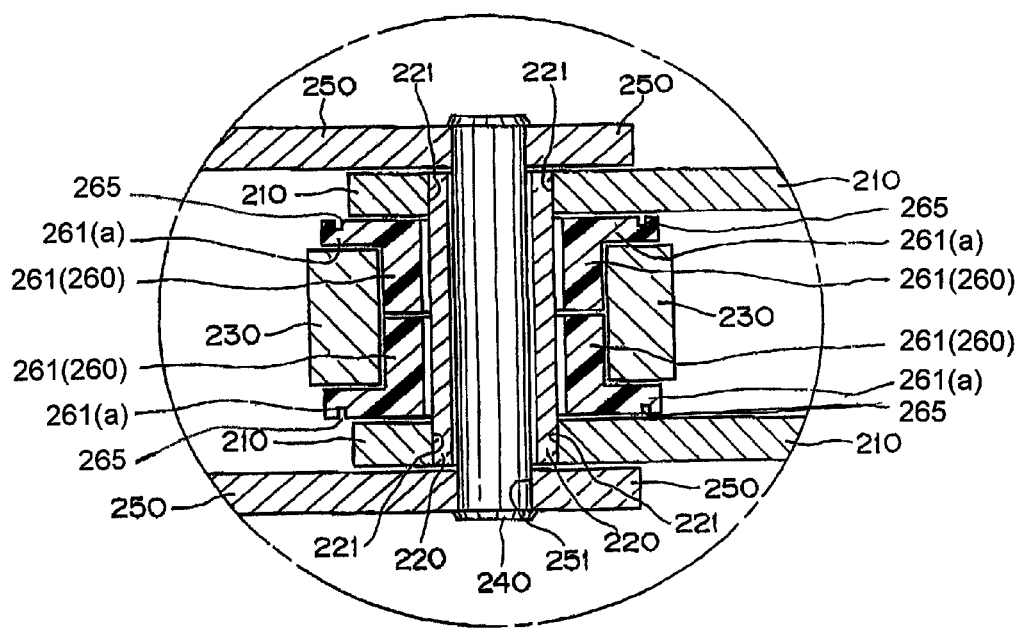
FIG. 4A is an enlarged view of the cross-sectioned parts of the chain in FIG. 4.

First, as shown in FIGS. 3 and 4, the sleeve-shaped spacer 260 is formed of wear resistant, heat resistant graphite and comprises a pair of right and left flanged ring members 261, 261, each having a flange 261a protruding beyond the end of the roller 230 toward the inner plate 210 and a body loosely fitted between the heat resistant roller 230 and the bush 220, and then it is concentrically provided between the heat resistant roller 230 and the bush 220.

Both end portions of a pair of right and left flanged ring members 261, 261 forming the sleeve-shaped spacer 260, are protruded beyond the end surfaces of the heat resistant roller 230 toward a pair of right and left inner plates 210, 210 so that the sliding contact between an end surface of the heat resistant roller 230 and an inner side surface of the inner plate 210 can be fully avoided.

It is noted that a circumferential portion of the sleeve-shaped spacer 260 protruding beyond the end portion of the heat resistant roller 230 is provided an annular groove 265 for visually judging the degree of wear in the sleeve-shaped spacer 260.

Since in the thus obtained wear resistant, heat resistant conveyor chain 200 of the second example of the present invention, the wear resistant, heat resistant sleeve-shaped spacer 260 composed of a pair of right and left flanged ring members 261, 261 is concentrically provided between the heat resistant roller 230 and the bush 220, the sleeve-shaped spacer 260 protrudes beyond the end surfaces of a heat resistant roller 230 toward the pair of right and left inner plates 210, 210 so that any sliding contact between the end surfaces of the heat resistant roller 230 and the inner side surfaces of the inner plate 210 can be fully eliminated. Thus, the formation of any metallic powder liable to be produced between an end surface of the heat resistant roller 230 and an inner side surface of the inner plate 210 is blocked even under environment of a heat resistant operation so that smooth sliding contact between an inner circumferential surface of the heat resistant roller 230 and an outer circumferential surface of the bush 220 can be maintained without generating one side wear therebetween, and at the same time a chain wear elongation is significantly suppressed so that the life of the chain can be maintained for a long period of time. Further, the sliding contact noise between the inner circumferential surface of the heat resistant roller 230 and the outer circumferential surface of the bush 220 is reduced so that quiet environment of a chain operation can be ensured.

Further, since the sleeve-shaped spacer 260 comprises a pair of right and left flanged ring members 261, 261, having a flange 261a protruding beyond the roller 230 toward the inner plate 210 and loosely fitted between the heat resistant roller 230 and the bush 220, the flange 261a of the flanged ring member 261 fully avoids the sliding contact between an end surface of the heat resistant roller 230 and an inner side surface of the inner plate 210, and reliably positions the heat resistant roller 230 on the flanged ring member 261 so that skewing, rocking or one-side positioning of the heat resistant roller 230 in the chain width direction can be avoided. Furthermore, contact surface pressure of the sleeve-shaped spacer 261 with respect to an inner side surface of the inner plate 210 is reduced whereby abrasion loss in the flanged ring member 261 itself is suppressed and a long-lasting insulation function between the end surface of the heat resistant roller 230 and the inner side surface of the inner plate 210 can be achieved.

The flanges 261a of the ring members 261 obviate the need to integrally connect the sleeve within the roller, and allow a loose fit. Since the pair of right and left flanged ring members 261, 261 are each loosely fitted between the heat resistant roller 230 and the bush 220, the assembling operation of the chain and any assembling/disassembling operation such as a coupling/decoupling operation of the chain can be easily performed. Any difference in coefficients of thermal expansion between a heat resistant roller 230 and a bush 220 is accommodated so that smooth sliding contact can be maintained. Further, the ring members need not be press-fitted into the roller, in this example of the invention, and since the pair of right and left flanged ring members 261, 261 are rotated about the bush 220 at a rotating speed slower than the heat resistant roller 230 due to slip generated between the flanged ring member 261 and the heat resistant roller 230, the sliding wear with respect to the inner side surface of the inner plate 210 is reduced even more so that excellent endurance can be achieved. Thus, the advantages of the second example of the present invention are very large.

The invention claimed is:

1. A wear resistant, heat resistant conveyor chain comprising a pair of right and left spaced inner plates having bush holes, a pair of right and left spaced outer plates having pin holes, bushes press-fitted into said bush holes, a heat resistant roller rotatably fitted onto each bush, a connecting pin rotatably inserted through said bush and into said pair of right and left spaced outer plates, said pins and outer plates interconnecting said inner plates with said adjacent links in a longitudinal direction of the chain by a press-fit of both ends of said connecting pin into said pin holes, wherein said chain includes a wear resistant, heat resistant sleeve-shaped hollow cylindrical spacer between said heat resistant roller and said bush, and integrally connected to an inner circumferential surface of said heat-resistant roller, said spacer having a length less than the spacing of said inner plates and having exposed ends with spacing from the inner side surfaces of said inner plates, said exposed ends protruding beyond each of said end surfaces of said heat resistant roller and spaced from said inner side surfaces of the inner plates to maintain said spacing between the end surfaces of said heat resistant roller and said inner side surfaces of said pair of right and left inner plates.

2. A wear resistant, heat resistant conveyor chain according to claim 1, wherein said roller is stainless steel and said spacer is graphite, and said spacer is integrally connected to said roller by a press-fit.

3. A wear resistant, heat resistant conveyor chain according to claim 1, wherein said sleeve-shaped spacer comprises a pair of right and left ring members having a flange, said flanges comprising said protruding ends, said spacer being loosely fitted between said heat resistant roller and said bush.

4. A wear resistant, heat resistant conveyor chain according to claim 1, wherein said sleeve-shaped spacer is composed of wear resistant, heat resistant graphite.

5. A wear resistant, heat resistant conveyor chain according to claim 1, wherein said protruding exposed ends of said spacer have annular grooves for visually judging the degree of wear in said spacer.

* * * * *